(12) United States Patent
Fried

(10) Patent No.: US 6,970,621 B1
(45) Date of Patent: Nov. 29, 2005

(54) PHASE OFFSET GRATINGS

(75) Inventor: Dale G. Fried, Dedham, MA (US)

(73) Assignee: Cambrius, Inc., Waltham, MA (US)

( * ) Notice: Subject to any disclaimer, the term of this patent is extended or adjusted under 35 U.S.C. 154(b) by 72 days.

(21) Appl. No.: 10/219,172

(22) Filed: Aug. 15, 2002

Related U.S. Application Data

(63) Continuation-in-part of application No. 10/096,297, filed on Mar. 12, 2002, now Pat. No. 6,912,331.

(51) Int. Cl.$^7$ .............................................. G02B 6/34
(52) U.S. Cl. ........................... 385/37; 385/11; 385/27; 385/28
(58) Field of Search .............................. 385/10, 11, 24, 385/27, 28, 37, 129, 130, 131

(56) References Cited

U.S. PATENT DOCUMENTS

| | | | |
|---|---|---|---|
| 5,195,161 A | 3/1993 | Adar et al. ................. | 385/129 |
| 5,495,543 A | 2/1996 | Alferness et al. ............ | 385/37 |
| 5,623,571 A | 4/1997 | Chou et al. ................. | 385/130 |
| 5,629,991 A | 5/1997 | Dragone ..................... | 385/11 |
| 5,715,271 A | 2/1998 | Huang et al. ............... | 372/102 |
| 5,889,902 A | 3/1999 | Laube et al. ................ | 385/14 |
| 6,175,670 B1 * | 1/2001 | Bergmann .................... | 385/14 |
| 6,192,058 B1 * | 2/2001 | Abeles ........................ | 372/6 |
| 6,553,162 B1 * | 4/2003 | Okayama ..................... | 385/37 |
| 6,707,956 B1 * | 3/2004 | Kim et al. ................... | 385/10 |

OTHER PUBLICATIONS

"Design of Polarization-Insensitive Bragg Gratings in Zero-Birefringence Ridge Waveguides", Wong et al., IEEE Journal of Quantum Electronics, vol. 37, No. 9, Sep. 2001; pp. 1138-1145.

"Fiber Grating Spectra"; Turan Erdogan; Journal of Lightwave Technology, vol. 15, No. 8; Aug. 1997; pp. 1277-1294.

"Grating Assisted Waveguide-to Waveguide Couplers"; Liang et al.; IEEE Photonics Technology Letters, vol. 10, No. 5, May 1998; pp. 693-695.

"Optical Waveguides with Apodized Gratings via Direct-Write Spatial-Phase-Locked E-Beam Lithography"; Hastings et al.; Dept. of Electrical Engineering and Computer Science; Massachusetts Institute of Technology, Rm. 39-427, Cambridge, MA 02139.

"Optimal Design of Grating-Assisted Directional Couplers"; Vittorio M. N. Passaro; Journal of Lightwave Technology, vol. 18, No. 7, Jul. 2000; pp. 973-984.

* cited by examiner

*Primary Examiner*—Brian M. Healy
(74) *Attorney, Agent, or Firm*—Gauthier & Connors LLP

(57) ABSTRACT

A grated waveguide is partitioned into two or more collateral gratings or sub-gratings, such as sidewall gratings, and the gratings are phase offset from each other to obtain a desired perturbation strength of the grated waveguide. Other waveguide parameters, such as the effective indices of modes and the difference in grating strength between modes, are minimally affected by the phase offset. A phase offset is differentiated from a more commonly used phase shift in that a phase shift can be defined as a longitudinal spatial translation of sequential or overlayed gratings relative to each other, whereas a phase offset can be defined as a longitudinal spatial translation of collateral gratings or sub-gratings relative to each other. The phase offset between gratings is also varied along the length of the waveguide to obtain an apodized grating strength.

14 Claims, 5 Drawing Sheets

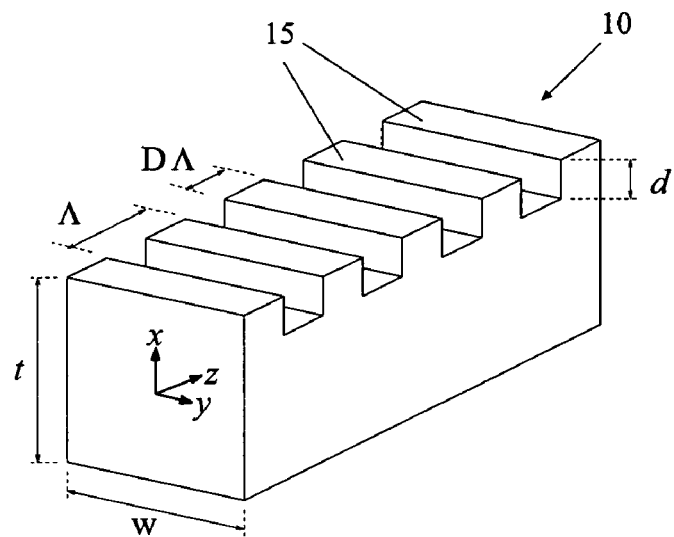
FIG. 1 - PRIOR ART
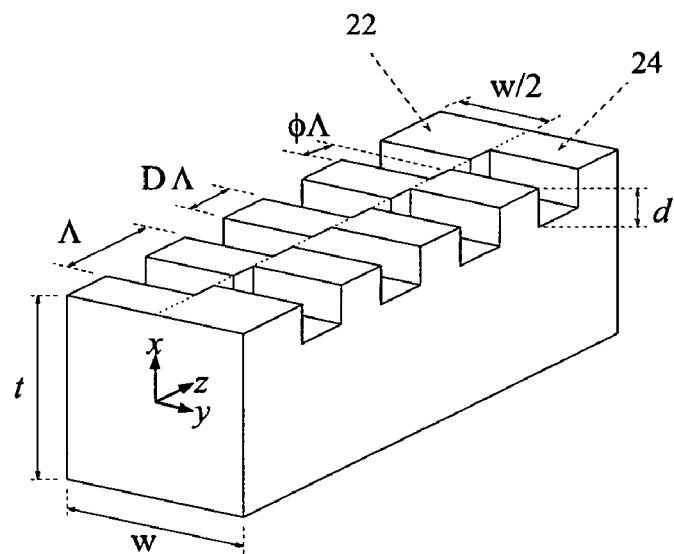
FIG. 2
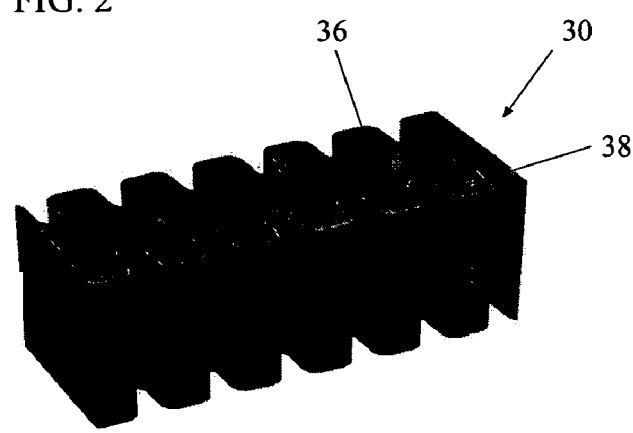
FIG. 3

PHASE OFFSET GRATINGS

PRIORITY INFORMATION

This application is a continuation-in-part application of Ser. No. 10/096,297 filed Mar. 12, 2002.

BACKGROUND OF THE INVENTION

In integrated optic wavelength division multiplexed (WDM) communication systems, designing a grating structure for a desired grating strength is a significant concern. Obtaining a desired grating strength typically requires the control of a number of grating design parameters, resulting in numerous design tradeoffs. These numerous parameters must also be precisely controlled during the fabrication process, often resulting in low yields.

Electromagnetic waveguides may have periodic structures, called gratings, introduced into them. A typical grated waveguide containing a grating is shown in FIG. 1. Waveguides containing such periodic structures are termed grated waveguides. A grated waveguide can be characterized by an effective index, $n_{eff}$, and a grating strength, κ, for each electromagnetic mode that propagates through the grated waveguide. The grating shape can be described by a period, Λ, and the dimensions of the periodic features, or "teeth".

Most gratings are designed by adjusting the shape and dielectric constants of the grated waveguide to simultaneously obtain a desired grating strength and effective index for each mode in the grated waveguide. Typically each of these parameters needs to meet a target specification to high precision.

A grated waveguide couples light between propagating modes, and is typically used to reflect or transmit light over an optical frequency band, or "bandgap", or "stopband", which is proportional to κ. The stopband width, or bandgap, Δω, is related to κ as $$\Delta\omega = \frac{2c\kappa}{n_g} \quad (1)$$

where $n_g$ is the modal group index and c is the speed of light. The frequency at the middle of the stopband is called the center frequency. The center radian frequency, $\omega_c$, of the stopband and the coupling order, q, are related to the effective index, $n_{eff}$, and the period, Λ, as $$\omega_c = \frac{2\pi cq}{n_{eff}} \frac{1}{\Lambda}. \quad (2)$$

A common application of a grating is to reflect light from the forward propagating mode to a backward propagating mode in a waveguide, such as in frequency filters, distributed Bragg reflector (DBR) laser cavities, and resonator cavities.

In integrated optical devices containing gratings, it is often desirable to have a variety of grated waveguides with differing strengths produced during the same fabrication process. Errors and fluctuations in the fabrication process make it difficult to obtain precise grating properties. Differences in these fabrication errors and fluctuations for the various grated waveguides on the device also make it difficult to precisely match the properties of the various gratings.

Additionally, in the design process, multiple design constraints must be simultaneously satisfied. Consequently, the design process is often complicated by the interdependencies of the design parameters, and a complex multivariable optimization is required.

One application in which a wide range of grating strengths are required, while the other grating properties are maintained to a high precision, is apodization. Apodization is the variation of the grating strength along the length of the gating so that, for example, the grating has a tapered grating strength and the spectral response of the grating is improved.

Previous grating design processes involve adjusting the shape parameters and dielectric constants of the grated waveguide, such as duty cycle and tooth depth, to simultaneously attain design criteria. One method of obtaining a desired grating strength is to adjust the duty cycle of the periodic structure. Alternatively, the tooth depth can be adjusted to obtain a desired grating strength for a single polarization mode. In many commercial applications, the modes of interest are the two polarization states of the lowest order spatial mode, or the "polarization modes". Apodized gratings with similar properties for the two polarization modes have been fabricated in grated waveguides by designing the tooth shape for each desired grating strength.

However, because the design parameters are interdependent, design flexibility can be significantly limited. In addition, because of these parameter interdependencies, some desired design criteria may not be achievable. Furthermore, these methods are sensitive to fabrication errors and fluctuations.

By adjusting the duty cycle of the grating teeth, the grating strength is engineered. However, the grating period must be simultaneously adjusted to compensate for the large effect of the duty cycle on the effective index. Alternatively, by adjusting the tooth depth of the grating, the target grating strength of one polarization can be attained. However, the cross section of the waveguide must be simultaneously adjusted to compensate for the effect of the adjusted tooth depth on the effective index of the grating. Typically, the optical properties of the other polarization modes are detrimentally affected. Fabrication errors and fluctuations can also degrade this compensation scheme.

In polarization controlled gratings that use various tooth shapes to achieve the range of grating strengths required for apodization, the fabrication difficulty increases. Typically, a fabrication process is optimized to produce a specific grating shape. When multiple shapes must be simultaneously fabricated, compromises, such as shape approximation, are inevitable, and fabrication fidelity is reduced. In addition, fabrication errors are manifested differently for the various shapes, resulting in unmatched errors. In apodization applications the tolerances on the matching of parameters are extremely tight and the fabrication errors result in even greater variations. The design complexity also increases because a complicated multivariable optimization must be performed for each grating strength.

SUMMARY OF THE INVENTION

The invention provides how a desired grating strength of a grated waveguide can be obtained by partitioning the grated waveguide into collateral gratings or sub-gratings, and using specific phase offsets between the gratings, with minimal effects to other typical design criteria and improved tolerance to fabrication errors.

This invention specifically provides partitioning a grated waveguide into collateral gratings or sub-gratings and using a phase offset between the gratings for adjusting the grating strengths of the modes in the grated waveguide with minimal impact to the effective indices of the modes or to the fractional difference in grating strength between various modes. The invention also provides methods of pre-compensating the effective indices and effective birefringences in fabricated systems.

In an exemplary embodiment, a surface grating of a grated waveguide is partitioned into two sub-gratings. The sub-gratings are phase offset relative to each other to obtain desired grating strengths.

In another exemplary embodiment, two sidewall gratings, or collateral gratings, of a polarization insensitive grated waveguide are phase offset by various amounts to obtain an apodized grating strength. The grated waveguide is designed for polarization insensitivity, and then phase offsets are used to vary the grating strengths along the length of the grated waveguide.

The invention is most applicable to grated waveguides that are designed for desired grating strengths of lowest order spatial and polarization modes, but applies to higher-order spatial modes as well. The invention is most suitable for integrated waveguide gratings, but can be used for any type of dielectric or periodic structure, such as Bragg gratings, fiber gratings, chirped gratings, and diffraction gratings.

The above and other features of the invention including various novel details of construction and combination of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

FIG. 1 is a perspective view of a prior art top surface grating;

FIG. 2 is a perspective view of a top surface grating partitioned into two sub-gratings that have a phase offset between them in accordance with the invention;

FIG. 3 is a perspective view of a grated waveguide having two sidewall gratings that are phase offset from each other;

DETAILED DESCRIPTION OF THE INVENTION

Figure 4:
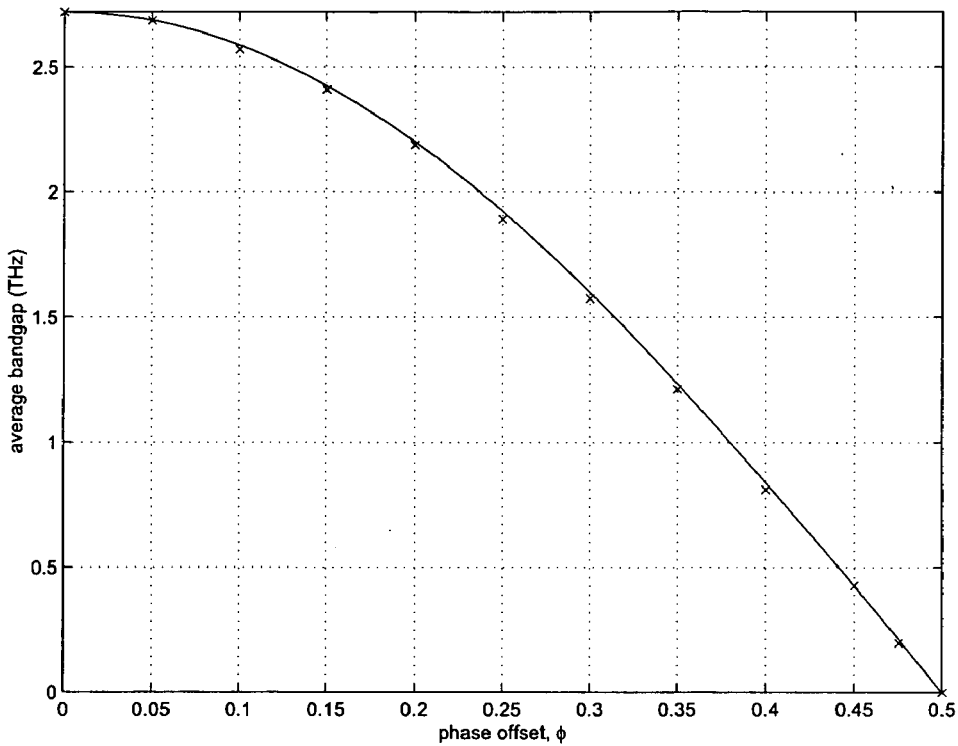
FIG. 4 is a plot of the average bandgap (stopband width) with respect to the phase offset between the sidewall gratings, for the embodiment shown in FIG. 3.

In the invention, phase offsets are introduced into a grated waveguide to reduce the grating strengths of propagating modes to desired values. The grated waveguide is first designed for desired polarization and other criteria. The grated waveguide is then partitioned into collateral gratings and sub-gratings that have phase offsets, relative to each other, to obtain the desired grating strengths. Collateral gratings and sub-gratings are gratings that are formed preferably in the same direction and are parallel to each other. For example, sidewall gratings are collateral gratings. Because the phase offsets can reduce the grating strengths to any desired value less than the maximum, the grating strength design criteria are reduced to the simpler requirement of designing the grating strengths to be greater than or equal to the maximum desired value.

In the invention, phase offsets are differentiated from phase shifts, which are widely used in grating designs. A phase shift can be defined as a longitudinal spatial translation of sequential or overlayed gratings relative to each other, whereas a phase offset can be defined as a longitudinal spatial translation of collateral gratings or sub-gratings relative to each other.

In an exemplary embodiment of the invention, a phase offset is used to adjust grating strengths of a top surface grating waveguide. FIG. 1 shows a grating 10 composed of rectangular teeth 15 formed by etching grooves into the top surface of a waveguide. The waveguide has a core index of $n_c$ and is surrounded by a cladding of index $n_{cl}$.

The width of the waveguide core is w w, the thickness is t, the grating tooth depth is d, the grating pitch is $\Lambda$, and the grating duty cycle is D.

To introduce a phase offset, $\phi$, into the surface grating, the grating 10 can be partitioned into two equal sub-gratings 22, 24, as shown in FIG. 2.

When the grating teeth are split along the center of the waveguide and $\phi$ is adjusted away from zero, the grating strength of the waveguide is reduced from its maximum, $\kappa_{\sigma,0}$, by $$\kappa_\sigma = \kappa_{\sigma,0} \cos(\phi\pi), \tag{3}$$

for all spatial or polarization propagation modes, indexed by $\sigma$. The grating strength can be reduced to zero by using a phase offset of $\phi=0.5$ so that the identical sub-gratings 22, 24 are out-of-phase.

Typically, in DWDM systems, only the lowest order spatial mode is of interest and allowed to propagate, but the device preferably behaves identically for all polarization states. The modes of immediate interest are, thus, two orthogonal polarization modes, labeled "TE" ($\sigma=1$) and "TM" ($\sigma=2$). The effective index sets the operating frequency, and thus the effective indices for the two modes, $n_1$ and $n_2$, must be identical to a very high precision, typically $1\times10^{-5}$. The grating strengths impact the penetration depth of each mode into the grating and, thus, a coupling strength between regions that are separated by grating sections. Coupling strengths, $\kappa_1$ and $\kappa_2$, of the modes must match the target couplings with a precision on the order of 1% in order to create sharp filter lineshapes required for tight channel spacings in DWDM communication systems. Using phase offsets enables the design of gratings that meet these tight tolerances on the polarization dependence of the effective index and grating strength.

Analytical Description

A variety of methods can be used to describe mode propagation in a waveguide, such as perturbation theory, beam propagation method, and finite difference time domain analysis. In this embodiment we have chosen to describe the invention using perturbation theory so that the underlying physical basis, including symmetry conditions, is apparent. However the invention is not limited to this analytical method and can be similarly described using any appropriate analytic method and mathematical form.

In a straight waveguide with no perturbation, or grating, four propagating modes of interest are the forward and backward propagation directions of the two polarization modes:

$$\epsilon_{1,+}(r,t) = E_1(x,y)e^{j(\omega t - \beta_1 z)} \tag{4}$$

$$\epsilon_{1,-}(r,t) = E_1(x,y)e^{j(\omega t + \beta_1 z)} \tag{5}$$

$$\epsilon_{2,+}(r,t) = E_2(x,y)e^{j(\omega t - \beta_2 z)} \tag{6}$$

$$\epsilon_{2,-}(r,t) = E_2(x,y)e^{j(\omega t + \beta_2 z)} \tag{7}$$

Here $\beta$ is the propagation constant for the mode at a given frequency $\omega$. The mode profiles $E_\sigma(x,y)$ are the eigenfunctions for the dielectric function $\epsilon_0(r)$ that describes the unperturbed waveguide structure. In addition to the explicit spatial dependence they also depend on the frequency through the propagation constant $\beta$.

When the grating perturbation is present, the dielectric function may be written as the unperturbed part and a perturbation, $$\epsilon^1(r) = \epsilon_0(r) + \Delta\epsilon(r), \tag{8}$$

where over one period the dielectric perturbation is $$\Delta\epsilon(r) = \begin{cases} (n_{cl}^2 - n_c^2) & 0 \leq z < (1-D)\Lambda \text{ and } |y| \leq w/2 \text{ and } t/2 - d \leq x \leq t/2 \\ 0 & \text{otherwise} \end{cases}, \tag{9}$$

where $n_{cl}$ is the cladding index and $n_c$ is the core index. Note that $\Delta\epsilon$ is periodic along the length of the waveguide: $\Delta\epsilon(r) = \Delta\epsilon(r + \Lambda\hat{z})$. The spatial Fourier transform of the dielectric perturbation is used to calculate the coupling between modes in the limit of a large number of grating periods. The perturbation may be written as a sum of contributions from each order l (l an integer) as $$D(r) = (n_{cl}^2 - n_c^2)\sum_l a_l e^{-j(2l\pi/\Lambda)z} \times \begin{cases} 1 & |y| \leq w/2 \text{ and } t/2 - d \leq x \leq t/2 \\ 0 & \text{otherwise} \end{cases}, \tag{10}$$

where $\alpha_l$ is the complex amplitude for order l. For points outside the grating (where $\Delta\epsilon$ vanishes), D=0.

The coupling between the forward and backward propagating waves of polarization mode $\sigma$ is then $$\kappa_\sigma = \frac{-\omega\epsilon_0}{4\pi} \int d^3r (\mathcal{E}_{\sigma,+}) * D(r)(\mathcal{E}_{\sigma,-}) \tag{11}$$

$$= \frac{-\omega\epsilon_0}{4\pi} \int_{-\infty}^{\infty} dx\, dy\, dz\, D(z) E_\sigma e^{j\beta_\sigma z} (E_\sigma e^{-j\beta_\sigma z})* \quad (12)$$

$$= \frac{-\omega\epsilon_0(n_c^2 - n_{cl}^2)}{4\pi} \underbrace{\int_{-w/2}^{w/2} dy \int_{t/2-d}^{t/2} dx |E_\sigma(x,y)|^2}_{\text{field integral}} \sum_l a_l \underbrace{\int_{-\infty}^{\infty} dz\, e^{j(2\beta_\sigma - 2l\pi/\Lambda)z}}_{\text{phase matching}}. \quad (13)$$

The z integral vanishes (integrates to zero over many periods) except when the grating wavevector couples the wavevectors of the two modes, the Bragg condition: $\beta_\sigma = l\beta_{Bragg} = l\pi/\Lambda$. Note that mode coupling may occur for integer multiples of $\beta_{Bragg}$ if the corresponding Fourier amplitude $\alpha_l$ is non-zero. Note also that when multiple gratings are present the total grating strength is just the sum of the individual grating strengths.

In this embodiment, the grating is partitioned into two halves, as shown in FIG. 2, so that, by symmetry, the field integral is identical for each sub-grating. The grating strength involves the sum of two identical Fourier components, but with an opposite phase offset, $\phi$,:

$$\alpha_{1,a} = |\alpha_1| e^{j\phi\pi} \quad (14)$$

$$\alpha_{1,b} = |\alpha_1| e^{-j\phi\pi} \quad (15)$$

The sum of these terms indicates that as the relative phase is adjusted away from zero, as previously indicated, the grating strength is reduced from its maximum $\kappa_{\phi=0}$:

$$\kappa = \kappa_{\phi=0} \cos(\phi\pi). \quad (16)$$

In this embodiment the modes of interest are the polarization and propagation direction modes of the grated waveguide. The polarization dependence of $\kappa$ depends on the field overlap of the mode with the grated waveguide but does not depend on the phase of the gratings. The polarization dependence of $\kappa$ depends on the field integral in equation 13, but not on the sum of the Fourier components (phase matching term). Therefore, the polarization dependence of the grating strength will not be affected as the phase is varied. Furthermore, the effective index and effective birefringence for the modes of the grated waveguide will also not be effected since the energy integral, to which they are inversely proportional, is unchanged by varying $\phi$:

$$U_\sigma = \int dr\, \epsilon^1(r) |E_\sigma(x,y)|^2. \quad (17)$$

The energy $U_\sigma$ depends on the zeroth Fourier component of $\Delta\epsilon$, $\alpha_0$, which is just the average of the perturbation, and is thus independent of $\phi$.

The phase offset grated waveguide is useful for commercial applications because a single etch depth and, therefore, a single processing step, can be used to produce various grating structures with very different strengths.

Although this embodiment has been described with respect to polarization modes it can easily be extended to any number of polarization and spatial modes.

In another exemplary embodiment, multiple gratings of a grated waveguide are phase offset relative to each other to obtain desired grating strengths. In this embodiment, shown in FIG. 3, two collateral gratings, or sidewall gratings, are phase offset to obtain a desired grating strength for two polarization modes, while having a minimal effect on the polarization characteristics of the grated waveguide.

When gratings are used in DWDM systems, typically only a lowest order spatial mode is allowed to propagate, but the grated waveguide behaves preferably identically for all polarization states. The modes of most interest in DWDM systems are two orthogonal polarization modes, labeled "TE" and "TM". The effective index sets the operating frequency, and, thus, $n_{TE}^{eff}$ and $n_{TM}^{eff}$ must be identical to a very high precision, typically $1 \times 10^{-5}$, for polarization independence.

Careful engineering is required to design a grated waveguide that meets these tight tolerances on the polarization dependence of the effective indices and grating strengths. However, once the grated waveguide is designed for polarization control, a phase offset between the gratings can be used to obtain the desired grating strength.

In this embodiment, a grating 36, 38 is etched on each sidewall of a waveguide, as shown in FIG. 3 forming a grated waveguide 30. The grating teeth are designed so that the grated waveguide is polarization independent, as described, for example, in U.S. patent application Ser. No. 10/096,297, entitled "Periodic Electromagnetic Waveguide Structures with Controlled Polarization Properties" filed Mar. 12, 2002, by common assignee, which is incorporated herein by this reference in its entirety.

In this embodiment, the polarization independent grated waveguide 30 is designed with the requirement that the grating strengths be substantially equal to each other and greater than the desired grating strength value. This is significantly simpler than simultaneously designing the grated waveguide for polarization control and the desired grating strength. Then, a phase offset between the two gratings is used to obtain the desired grating strengths.

Figure 5:
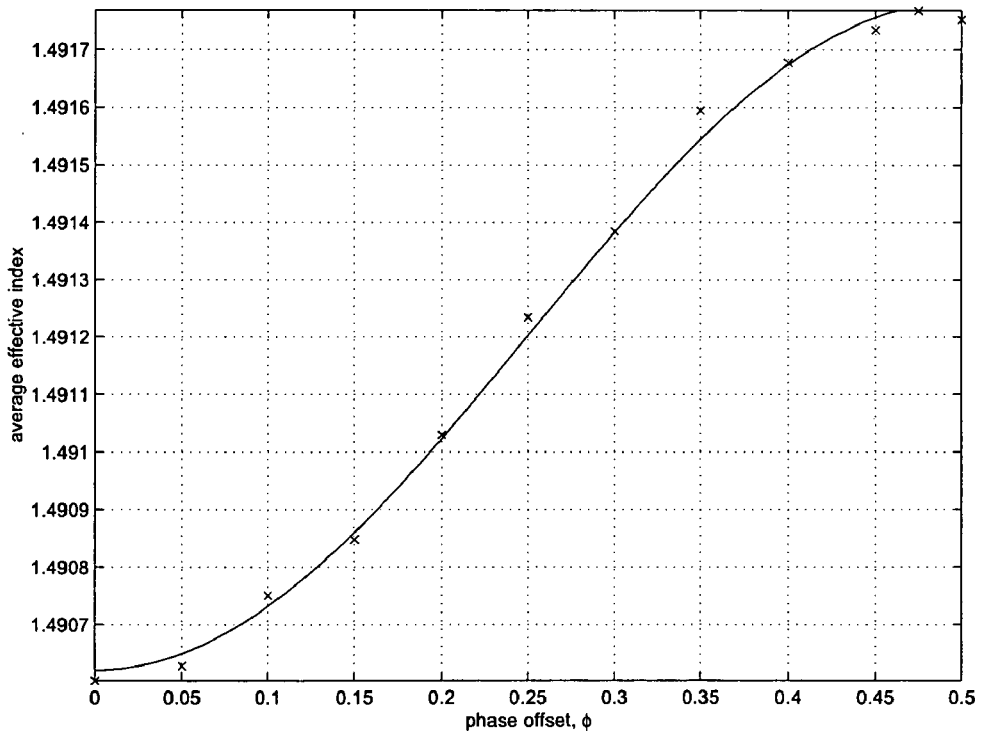
FIG. 5 is a plot of the average effective index with respect to the phase offset between the sidewall gratings, for the embodiment shown in FIG. 3.
Figure 6:
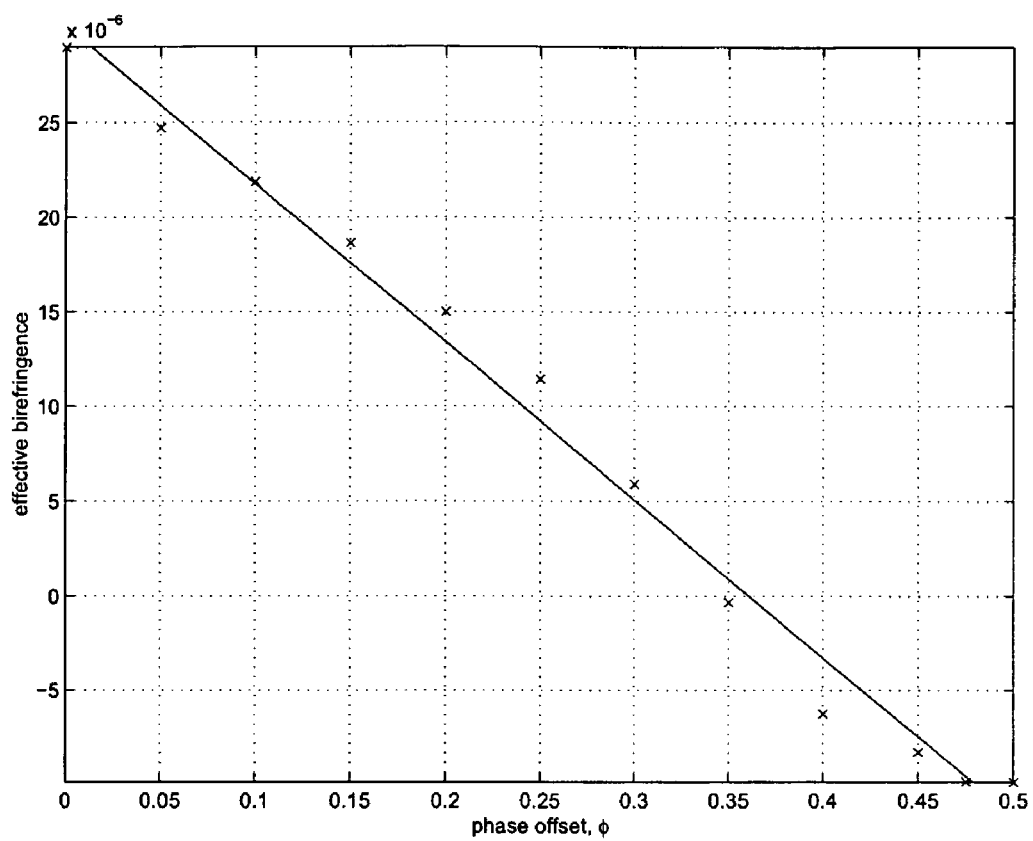
FIG. 6 is a plot of the effective birefringence with respect to the phase offset between the sidewall gratings, for the embodiment shown in FIG. 3.

FIGS. 4, 5, and 6 show how the phase offset can be used to adjust the grating strengths without substantially affecting the polarization dependence of the grating strengths, the effective index, and the effective birefringence. The grated waveguide has cladding index $n_{cladding}=1.4451$, $n_{core}=1.6$, core material birefringence $b=0.002$, and core thickness $t=1.3$ μm. The grating teeth are designed to produce a maximum stopband width of 2.7 THz that is polarization independent to a fractional precision of $2 \times 10^{-3}$. The tooth depth is $d=0.3555$ μm on each grating, and the width of the waveguide at the narrowest region is $w_{min}=0.5227$ μm. The grating pitch is $\Lambda=0.518$ μm, and the center of the stopband is at 194.155 THz.

FIG. 4 shows the variation of the average bandgap (stopband width) with respect to the phase offset, which is measured as a fraction of the pitch, between the two sidewall gratings, and can be well described by $\kappa_0 \cos(\pi\phi)$, shown by the solid line in FIG. 4. The data points in FIG. 4 are calculated using a numerically exact mode solver. The average bandgap is the average bandgap of the two polarization modes in the grated waveguide of this embodiment. The desired bandgap, between a maximum of 2.7 THz and zero in this embodiment, can be obtained by designing the gratings with the appropriate phase offset.

Over the same range of phase offset values, the polarization dependence of the bandgap only varies by up to 0.15%. The polarization dependence of the bandgap is the difference in grating strength between the two polarization modes of interest, in this embodiment.

FIG. 5 shows the variation of the average effective index with respect to phase offset, and can be described by $c_1-c_2 \cos(2\pi\phi)$, shown by the solid line FIG. 5. The data points in FIG. 5 are calculated using a numerically exact mode solver. The average effective index is the average of the effective index of all the modes in the grated waveguide. In this embodiment, the average effective index only changes by at most 0.0805% over the same range of phase offset values. This small variation reflects the limitations of the first order perturbation theory description used in this embodiment.

The center radian frequency is inversely related to the average effective index and also varies by 0.0805% over the same range of phase offset values in this embodiment. This corresponds to a center frequency variation of 156 GHz.

FIG. 6 shows the variation of the effective birefringence, $b_{eff}$, with respect to the phase offset. The solid line in FIG. 6 is a linear fit and the data points are calculated using a numerically exact mode solver. The effective birefringence is the combination of the material birefringence and the form birefringence. The form birefringence can be derived from the waveguide cross-section and the index contrast between $n_{cladding}$ and $n_{core}$.

Pre-Compensation

Although the phase offset has a minimal effect on design criteria other than the grating strength, small variations that can occur may need to be compensated to meet target specifications to high precision. These effects are generally intensified as the grating strengths are increased since the gratings perturb the modes more profoundly.

In this embodiment, as shown in FIGS. 3, 4, 5, and 6, where strong gratings are used, the effective indices and effective birefringence may be slightly impacted by using the phase offset $\phi$. Because the effects of the phase offset on the grated waveguide parameters can be accurately predicted and characterized, these slight variations can be pre-compensated during design using simple adjustments.

The effective index variation, shown in FIG. 5 can be well fit by functions such as $\Delta n(\phi)=\cos(2\pi\phi)$ or $\Delta n(\phi)=\cos(2\pi(c_1\phi^2+c_2\phi+c_3))$ that are flat at $\phi=0$ and $\phi=0.5$. The grated waveguide design can be iteratively refined to compensate for the effective index variation, once a phase offset is selected.

In order to compensate for the variation of the desired center radian frequency, $\omega_c$, due to phase offset, the pitch can be adjusted using existing techniques, such as described in Erdogan, T., "Fiber grating spectra", Journal of Lightwave Technology, Vol. 15, No. 8, 1277 (1997), incorporated herein by reference, to achieve the desired $\omega_c$ and $\phi$:

$$\Delta \Lambda = \frac{c}{2\omega_c \Delta n(\phi)}. \tag{18}$$

The variation in $b_{eff}$ with phase can be adjusted by fine tuning the waveguide width away from the design point $w_0$ as $\phi$ changes. FIG. 6 shows a nearly linear variation of $b_{eff}$ with $\phi$ from which the slope, $\partial b_{eff}/\partial \phi$, can be determined. Given the partial derivative of the effective birefringence with width $\partial b_{eff}/\partial w$, which can be calculated independently, the designed waveguide width, w, can be calculated, using a desired waveguide width, $w_0$, and $\phi$, as $$w = w_0 - \frac{\frac{\partial b_{eff}}{\partial \phi}}{\frac{\partial b_{eff}}{\partial w}}\phi. \tag{19}$$

Apodization

Figure 7A:
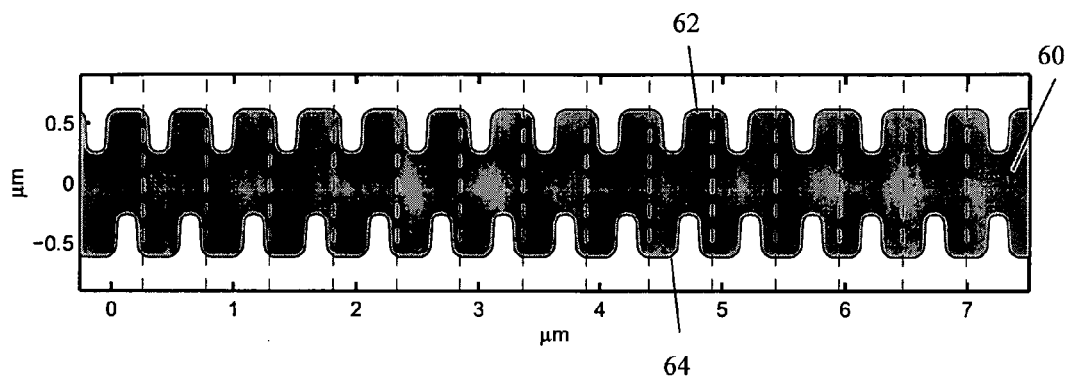
FIG. 7A is a plan view of an apodized grated waveguide with two sidewall gratings that have a linearly varying phase offset.
Figure 7B:
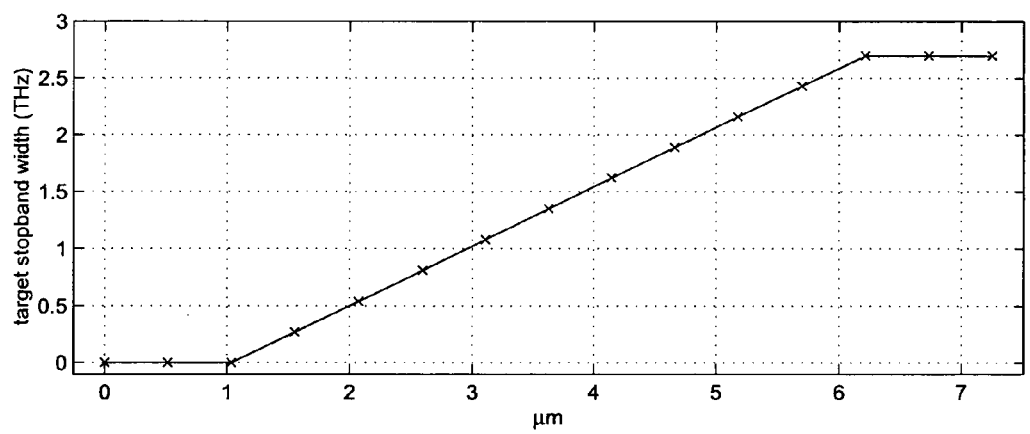
FIG. 7B is a graph of the target stopband width along the length of the grated waveguide.

In another exemplary embodiment of the invention, a grating strength of a grated waveguide 60 with two sidewall gratings 62, 64 is varied along the length of the waveguide using different phase offsets, as shown in FIG. 7A, to obtain a grating strength apodization. FIG. 7B shows the linear apodization of the grating strength from a bandgap of 0 THz to a bandgap of 2.7 THz over about 5 um, where the grating strength is directly proportional to the bandgap. Unit cells showing one period each are indicated by dashed lines in FIG. 7A. In the first 2 periods, the sidewall gratings have a phase offset of 0.5 so that they are out of phase and produce a bandgap of 0. By the last two periods, the two sidewall gratings have a phase offset of 0 so that they are in phase and produce a maximum bandgap of 2.7 THz. By slightly adjusting the duty cycle over each period, the phase offset can be gradually adjusted over many periods.

The manner in which the phase offsets are made in each unit cell can also produce phase shifts. The phase offsets in each unit cell are engineered to obtain the desired average phase shift along the length of the grated waveguide. The phase shift in each unit cell can be defined as $$\theta = \frac{\phi_1 + \phi_2}{2}. \tag{20}$$

where $\phi_1$ and $\phi_2$ are the phase offsets of the first and second gratings, respectively, relative to the center of the unit cell.

In this embodiment, each sidewall grating is preferably offset by $\phi/2$ in opposite directions, relative to their original zero offset position, so that a phase shift is not produced in the grated waveguide 60. For example, in the first period of this embodiment, the first sidewall grating 62 is offset by $-\phi/2$ and the second sidewall grating 64 is offset by $+\phi/2$. If one sidewall grating is held stationary and the other sidewall grating is offset by $\phi$, an overall phase shift equivalent to $\phi/2$ is produced in the grated waveguide.

This apodized grated waveguide is also more tolerant to fabrication errors. Fabrication errors that specifically affect the tooth shape will be the same for the entire grated waveguide because the apodization uses the same tooth shape for all the phase offsets. As a result, all of the teeth will have the same error. However, the apodization will not be affected. The specific grating strengths values may be affected by the fabrication error, but the apodization will not. This is particularly useful for several grated waveguides that have relative grating strengths. It also improves the reliability of the apodization.

Multiple Asymmetric Gratings

Figure 8:
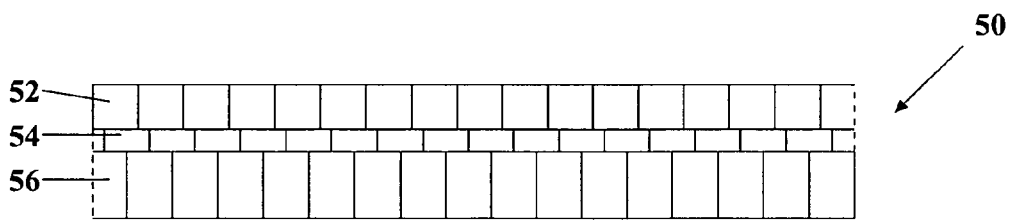
FIG. 8 is a plan view of a top surface grated waveguide partitioned into three sub-gratings.

In another exemplary embodiment of the invention, a plurality of sub-gratings are created on a single grated waveguide 50, each of which can have a phase offset relative to the other sub-gratings. In this embodiment, a top surface grating is partitioned into three collateral sub-gratings 52,

54, 56. Each sub-grating is phase offset by a different amount to obtain desired grating strengths while minimally affecting other grating characteristics. The sub-gratings are preferably equal in size but can be asymmetric, as shown in FIG. 8.

The number of sub-gratings can be increased to any desired number, with each sub-grating having its own phase offset.

Grating Coupling

Figure 9:
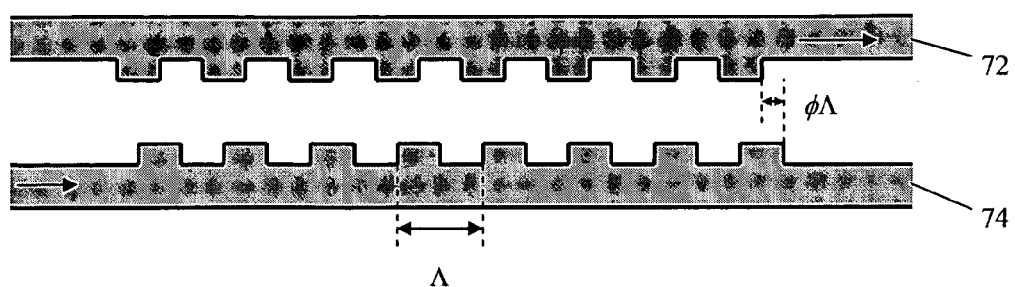
FIG. 9 is a schematic view of a grating assisted coupling structure comprising two waveguides having one grating each, with a phase offset between the gratings.
Figure 10:
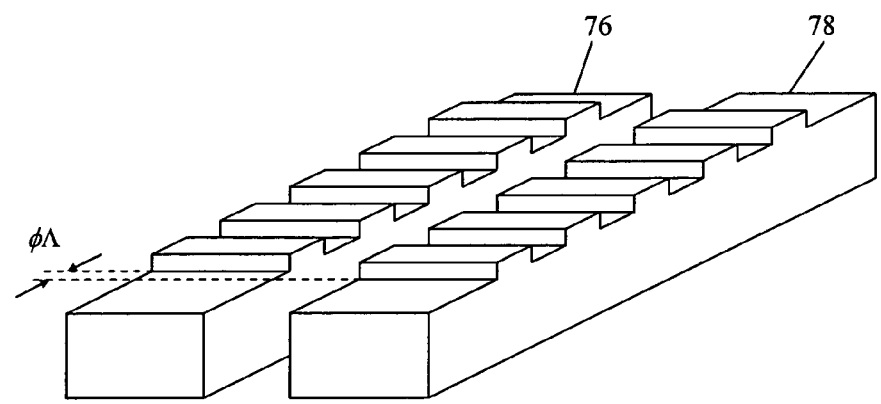
FIG. 10 is a perspective view of a coupled waveguide structure comprising two waveguides having one surface grating each, with a phase offset between the gratings.

A phase offset can also be used in a grating assisted structure to engineer a desired coupling. In another exemplary embodiment of the invention, a phase offset, φ, is used in a grating assisted coupling structure comprising two waveguides 72, 74 with one grating each, as shown in FIG. 9. The waveguide to waveguide coupling is engineered by adjusting the phase offset between the gratings. An alternate configuration of this embodiment is shown in FIG. 10, where two coupled waveguides 76, 78 have surface gratings that are phase offset from each other by φ. The phase offset can be applied to any structure having two or more collateral gratings, as shown in this embodiment.

OTHER EMBODIMENTS

In another exemplary embodiment, grating strengths of a MEMs based grating are statically and dynamically phase controlled by physically sliding collateral gratings beside each other to produce a phase offset between the gratings.

In another exemplary embodiment, in a microwave waveguide, a grating can be physically slid along the length of another grating to change the phase offset and, thus, dynamically control grating strengths of the grating.

In another exemplary embodiment, gratings formed by acousto-optic effects employ phase offsets to control grating strengths of the grating. The angle of the acoustic wave relative to the waveguide can be varied to adjust the grating strengths.

In another exemplary embodiment, gratings formed in polarization mode fibers, such as PANDA and Bow-Tie fibers, can also be used. Gratings are fabricated in the fiber and the phase offset is used to engineer the desired coupling.

The invention can be applied to any grating, or gratings, that can be partitioned into two or more collateral gratings and/or sub-gratings, such as, but not limited to, planar waveguide gratings, Bragg gratings, MEMs gratings, acousto-optic gratings, microwave gratings, fiber gratings, chirped gratings and diffraction gratings. The phase shift between gratings can be induced by acoustic, optic, piezo, electric, or mechanical means. In addition to phase offsets between sub-gratings, collateral gratings can also have phase offsets relative to each other.

Although the invention has been shown and described with respect to several exemplary embodiments thereof, various changes, omissions and additions to the form and detail thereof, may be made therein, without departing from the spirit and scope of the invention.

What is claimed is:

1. A waveguide structure comprising:
   at least one waveguide;
   at least two collateral gratings; and
   at least one phase offset between said collateral gratings.

2. A waveguide of claim 1, wherein said gratings comprise planar waveguide gratings.

3. A waveguide of claim 1, wherein said gratings include sub-gratings.

4. A waveguide of claim 1, wherein said gratings include collateral gratings.

5. A waveguide of claim 1, wherein said waveguide has at least one propagating mode.

6. A waveguide of claim 5, wherein said propagating mode includes at least one polarization mode.

7. A waveguide of claim 5, wherein said propagating mode includes at least one spatial mode.

8. A waveguide of claim 1, wherein a strength of the grating is the same for each mode.

9. A waveguide of claim 1, wherein at least two of said gratings have the same period.

10. A waveguide of claim 1, wherein said gratings include one surface grating comprising at least two sub-gratings.

11. A waveguide of claim 1, wherein said gratings include two sidewall gratings.

12. A waveguide of claim 1, wherein strength of at least one grating varies along the length of said gratings.

13. A waveguide of claim 12, wherein said variation of the strength of said grating includes apodization.

14. A waveguide of claim 12, wherein said variation of the strength of said grating has a linear function.

* * * * *